(12) United States Patent
Bratkovski et al.

(10) Patent No.: US 7,133,577 B1
(45) Date of Patent: Nov. 7, 2006

(54) OPTICAL MODULATOR AND METHODS OF MAKING AND USING OPTICAL MODULATOR

(75) Inventors: Alexandre M. Bratkovski, Mountain View, CA (US); Shih-Yuan Wang, Palo Alto, CA (US); Theodore I. Kamins, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/144,788

(22) Filed: Jun. 6, 2005

(51) Int. Cl.
*G02F 1/035* (2006.01)
(52) U.S. Cl. .................................................. 385/2
(58) Field of Classification Search ............... None
See application file for complete search history.

(56) References Cited

U.S. PATENT DOCUMENTS

| | | | | |
|---|---|---|---|---|
| 4,705,361 A | * | 11/1987 | Frazier et al. | 359/263 |
| 4,787,691 A | * | 11/1988 | Lorenzo et al. | 385/3 |
| 4,832,430 A | * | 5/1989 | Tada et al. | 385/40 |
| 4,877,299 A | * | 10/1989 | Lorenzo et al. | 385/3 |
| 5,140,651 A | * | 8/1992 | Soref et al. | 385/2 |
| 6,219,170 B1 | * | 4/2001 | Kimura et al. | 359/248 |
| 6,954,558 B1 | * | 10/2005 | Liu | 385/3 |
| 2005/0089257 A1 | * | 4/2005 | Barrios et al. | 385/2 |

OTHER PUBLICATIONS

Light Trapping in Alkaline Texture Etched Crystalline Silicon Wafers, J. D. Hylton et al., ECN Solor Technology, 4 pgs.
The Optical Modulator and Switch Light On The Move, www.llnl.gov/str/weiskamp.html, Oct. 1999, 4 pages.
Semiconductor Physics Group, Bandgaps of SiGe, University of Cambridge, www.sp.pht.cam.ac.uk/dp109/bandgap.htmp, copyright 2005 Semiconductor Physics Group, 1 page.
Intel Technology Journal., Optical Technologies and Applications, silicon Photonics, pp. 143-160, Intel Technology Journal, vol. 8, Issue 2, 2004.
Control Of Lateral Epitaxial Chemical Vapor Deposition Of Silicon Over Insulators, D.R. Bradbury et al., J. Appl. Phys. 55 (2), Jan. 15, 1984, pp. 519-523.
A High-Speed Silicon Opitcal Modulator Based On A Metal-Oxide-Semiconductor Capacitor, Ansheng Liu et al., Nature/vol. 427/Feb. 12, 2004, pp. 615-618.

* cited by examiner

*Primary Examiner*—Michelle Connelly-Cushwa
*Assistant Examiner*—Chris Chu

(57) ABSTRACT

An optical modulator includes a confinement region of semiconductor material defining at least a portion of a light path through the optical modulator. The optical modulator also includes electrical contacts for connection with a voltage source for injecting carriers into the confinement region. The injected carriers impede light propagating through the confinement region, to thereby modulate light intensity. Contact regions in electrical contact with the confinement region remove injected carriers from the confinement region. Methods of modulating light and of making the optical modulator are also disclosed.

29 Claims, 5 Drawing Sheets

OPTICAL MODULATOR AND METHODS OF MAKING AND USING OPTICAL MODULATOR

BACKGROUND

In fiber optic telecommunication systems, information is carried by light. Infrared wavelengths in the range of about 1.1 µm to 1.6 µm are common to silica fiber optic communication. Silicon is nearly transparent within this wavelength range, making silicon a desirable material for guiding optical data streams between active components of such systems.

For infrared light emission in the range of about 1.1 µm to 1.6 µm, lasers that emit at wavelengths within this range can be used as the light source. The laser output is a continuous wave carrying no data or information. For optical communications, an optical modulator can be used to encode data onto the continuous wave of light. Silicon waveguide-based optical modulators have been made. It would be desirable, however, to have an optical modulator device that can provide higher speed operation and improved efficiency.

SUMMARY

An exemplary embodiment of an optical modulator comprises a confinement region of semiconductor material, the confinement region defining at least a first portion of a light path through the optical modulator; electrical contacts for connection with a voltage source for injecting carriers into the confinement region to impede light propagating through the confinement region; and contact regions in electrical contact with the confinement region for removing injected carriers from the confinement region.

Another exemplary embodiment of an optical modulator comprises a confinement region of semiconductor material, the confinement region defining at least a portion of a light path through the optical modulator; means for connection with a voltage source for injecting carriers into the confinement region to impede light propagating through the confinement region; and means in electrical contact with the confinement region for removing injected carriers from the confinement region.

An exemplary method of modulating light comprises emitting light from a light source; propagating the light through a confinement region of an optical modulator, the confinement region being of semiconductor material defining at least a portion of a light path through the optical modulator; injecting carriers into the confinement region to impede light propagating through the confinement region; and removing injected carriers from the confinement region.

An exemplary method for making an optical modulator comprises forming a confinement region of semiconductor material, the confinement region defining at least a portion of a light path through the optical modulator; forming electrical contacts for connection with a voltage source for injecting carriers into the confinement region to impede light propagating through the confinement region; and forming contact regions in electrical contact with the confinement region for removing injected carriers from the confinement region.

BRIEF DESCRIPTION OF THE DRAWINGS

The following detailed description of exemplary embodiments can be read in connection with the accompanying drawings, in which.

DETAILED DESCRIPTION

Figure 1A:
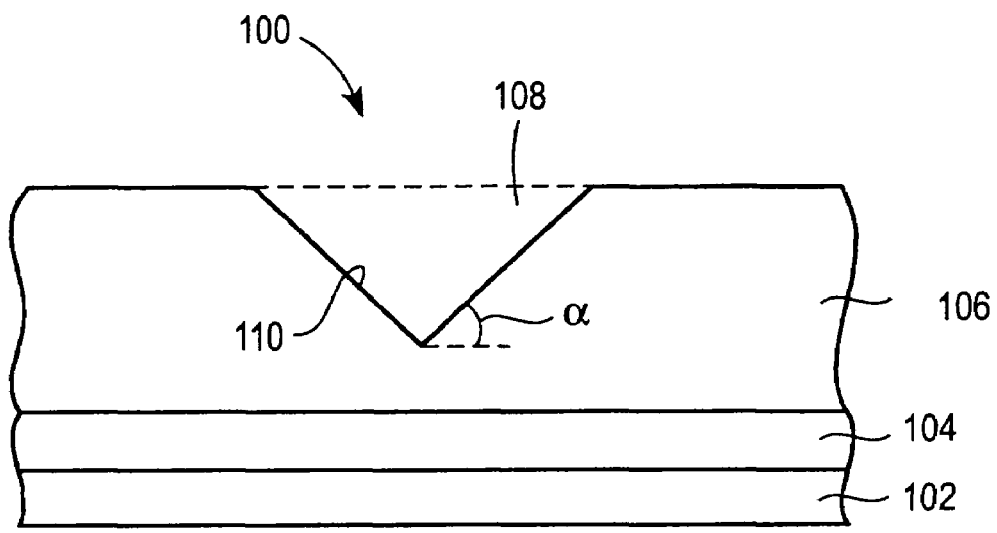
FIG. 1A illustrates a portion of an exemplary embodiment of an optical modulator.
Figure 1B:
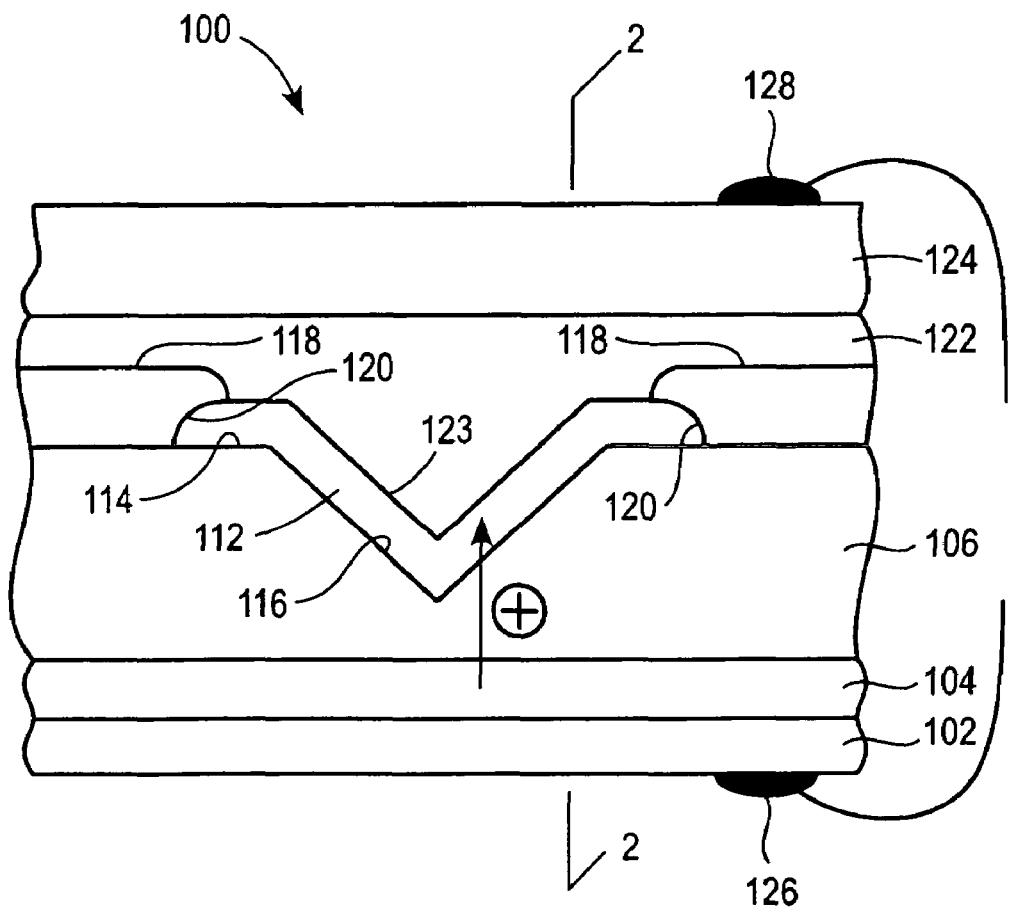
FIG. 1B illustrates an exemplary embodiment of an optical modulator after subsequent processing steps have been performed on the portion shown in FIG. 1A.

FIG. 1A shows a portion of an exemplary embodiment of an optical modulator 100, and FIG. 1B shows the optical modulator following further fabrication steps. The optical modulator 100 includes a substrate 102. The substrate 102 can be of any suitable material including silicon, such as p+ silicon, or a metal. The composition of the substrate 102 can be selected based on the connection to which an ohmic contact is to be made.

A first layer 104 is formed on the substrate 102. The first layer 104 can be of silicon, such as p− silicon.

A second layer 106 is formed on the first layer 104. The second layer 106 can be of n− silicon. The second layer 106 includes a groove 108. The groove 108 is preferably V-shaped, as depicted. The V-shaped groove 108 is defined by sidewalls 110 oriented at an angle α relative to the horizontal. The angle α of the sidewalls 110 is preferably about 55°, which can be obtained by forming the sidewalls 110 to extend along [111] planes of silicon. The groove 108 can be formed by etching the second layer 106 as depicted in dashed line in FIG. 1A. The sidewalls 110 oriented at an angle of about 55° can be formed in the second layer 106 using a suitable selective etchant having high anisotropy, such as solutions containing KOH, ethylenediamene pyrocatecol (EDP), or the like.

As shown in FIG. 1B, a third layer 112 is disposed on the sidewalls 110 of the groove 108. The third layer 112 can optionally also be formed on the surface 114 of the second layer 106, as shown. The second layer 106 and third layer 112 have opposed surfaces defining an interface 116. The portion of the third layer 112 disposed on the sidewalls 110 has a V-shaped cross-section, as shown.

The third layer 112 is preferably of a narrow band gap material that is compatible with silicon. The third layer 112 can be of $Si_{1-x}Ge_x$, where $x \leq 1$. That is, the third layer 112 can be of pure Ge or a Si—Ge alloy. The second layer 106, third layer 112, and a fourth layer 122 disposed on the third layer 112 form a heterostructure region of the optical modulator 100. In the optical modulator 100, the third layer 112 is the confinement region. As described herein, the "confinement region" is the region of the optical modulator where carrier confinement predominately occurs. In the optical modulator 100, carrier confinement predominately occurs in the third layer 112. Some carrier spillover into the second layer 106 and/or into the fourth layer 122 may occur during operation of the optical modulator 100. In the embodiment, the confinement region of the third layer 112 confines holes, which are the injected carriers. Increasing the germanium content of the $Si_{1-x}Ge_x$ alloy decreases the bandgap and increases the depth of the $Si_{1-x}Ge_x$ confinement region well. Preferably, the third layer 112 contains at least about 10 atomic % Ge (i.e., $x \geq 0.1$) to provide for desirable carrier confinement during operation of the optical modulator 100.

In the optical modulator 100, the third layer 112 can have a thickness ranging from about 5 nm to about 500 nm, preferably from about 20 nm to about 500 nm, more preferably from about 100 nm to about 500 nm. As described below, increasing the thickness of the third layer 112 increases the cross-sectional area of the confinement region perpendicular to a propagation direction of light through the optical modulator 100, which increases the size of the region of the optical modulator 100 where absorption/light scattering processes can occur. However, making the third layer 112 too thick can result in crystal defects in the third layer. Such defects are undesirable because they may decrease light transmission and increase the leakage current of p–n junctions. Accordingly, the thickness of the third layer 112 can be optimized in view of these considerations. Also, increasing the length of the light path through the optical modulator 400 increases the carrier interaction length and, therefore, enhances modulation.

As shown in FIG. 1B, contact regions 118 are formed in electrical contact with the third layer 112. The interfaces 120 between the contact regions 118 and the third layer 112 can be heavily doped to improve ohmic contact. The contact regions 118 can optionally also contact the second layer 106, as shown. The contact regions 118 can be metal electrodes or, alternatively, can be intermediate regions leading to metal electrodes.

The fourth layer 122 is disposed on the third layer 112 and optionally on the contact regions 118, as shown. The fourth layer 122 can be of n– silicon. The third layer 112 and the fourth layer 122 define an interface 123.

The optical modulator 100 can also include an optional fifth layer 124 on the fourth layer 122. The fifth layer 124 can be of n+ silicon.

Electrical contacts 126, 128 can be formed on the substrate 102 and fifth layer 124. The electrical contacts 126, 128 can be connected to a voltage source for injecting carriers (holes) into the third layer 112.

In another exemplary embodiment, the optical modulator can be fabricated such that the conductivity type of the respective layers of the optical modulator 100 shown in FIG. 1B can be flipped top-to-bottom, depending on considerations, such as what structure is under the optical modulator, and what optical modulator structure is more practical to build based on various factors, such as autodoping, series resistance, and the like.

Layers of the optical modulator 100 can be grown by any suitable thin film deposition technique, such as chemical vapor deposition (CVD) techniques or molecular beam epitaxy. Available patterning techniques (i.e., lithography and etch processes) can be used during formation of the groove 108, for example. The layers of the optical modulator 100 can be fabricated in a single reactor. Alternatively, the layers can be fabricated in more than one reactor. For example, one or more doping steps used for doping selected portions of the optical modulator 100 can be performed in a different reactor.

Figure 2:
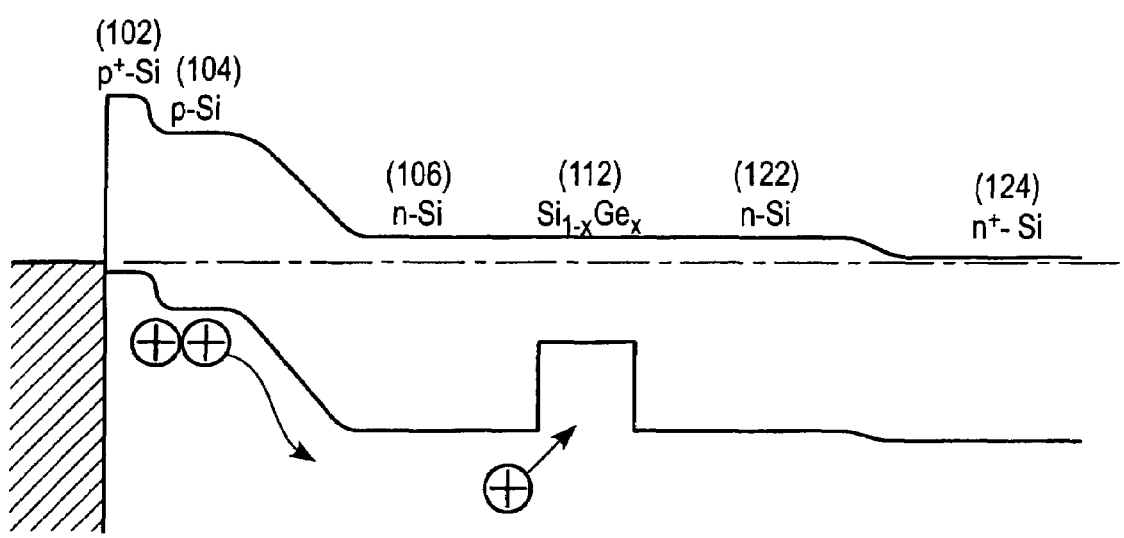
FIG. 2 depicts an energy band diagram for the optical modulator shown in FIG. 1B along line 2—2.

FIG. 2 depicts an energy band diagram for an exemplary embodiment of the optical modulator 100 taken along line 2—2 shown in FIG. 1B, in the direction from the substrate 102 to the fifth layer 124. The diagram indicates the location of the bandgap discontinuity in the valence band at the third layer 112. The confinement region of the third layer 112 confines holes injected from the second layer 104.

Figure 3A:
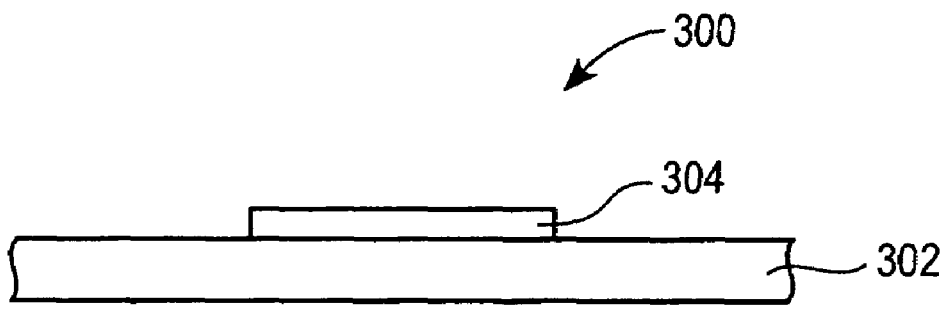
FIG. 3A illustrates a portion of another exemplary embodiment of the optical modulator.
Figure 3B:
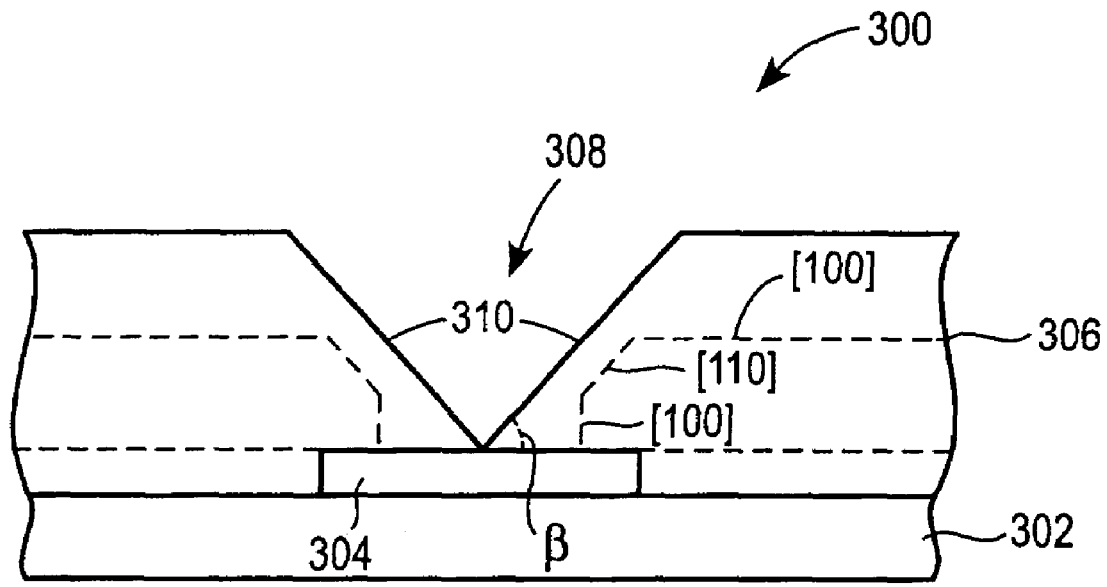
FIG. 3B illustrates the portion of the optical modulator shown in FIG. 3A following further fabrication.

FIGS. 3A and 3B illustrate process steps for fabricating regions of another exemplary embodiment of the optical modulator 300. As shown in FIG. 3A, an insulator material 304, such as $SiO_2$, is formed on a surface of the substrate 302. The substrate 302 can be of single crystal silicon or another suitable material, such as a p– silicon wafer. As shown in FIG. 3B, a layer 306, which can be of single crystal silicon, is grown over the insulator material 304 and over the substrate 302.

The layer 306 can be grown by the lateral epitaxial chemical vapor deposition technique described by D. R. Bradbury, T. I. Kamins and C.-W. Tsao, "Control of lateral chemical vapor deposition of silicon over insulators," J. Appl. Phys. 55(2), 519 (1984). The progressive change in the lateral growth of the layer 306 during the lateral epitaxial chemical vapor deposition technique is depicted by dotted lines in FIG. 3B. During the deposition process, the nucleation of polycrystalline silicon on the insulator material 304 is suppressed by adding HCl to $SiH_4$ deposition gas. The partial pressure of the HCl is varied during different stages of the deposition process to control the relative amounts of the deposition bounded by [100] and [110] planes and, consequently, the shape of the laterally advancing growth fronts. Fronts from opposite sides of the insulator material 304 join uniformly. The sidewalls 310 defining the V-groove 308 can typically be oriented at an angle $\beta$ of about 45° (i.e., a [110] plane).

After the regions of the optical modulator 300 shown in FIG. 3B have been fabricated, a confinement region, contact regions, additional layers, and electrical contacts (such as the Si—Ge layer 112, contact regions 118; layers 122, 124; and electrical contacts, 126, 128 of the embodiment shown in FIG. 1B) can be formed over the layer 306 to complete the optical modulator structure.

Figure 4:
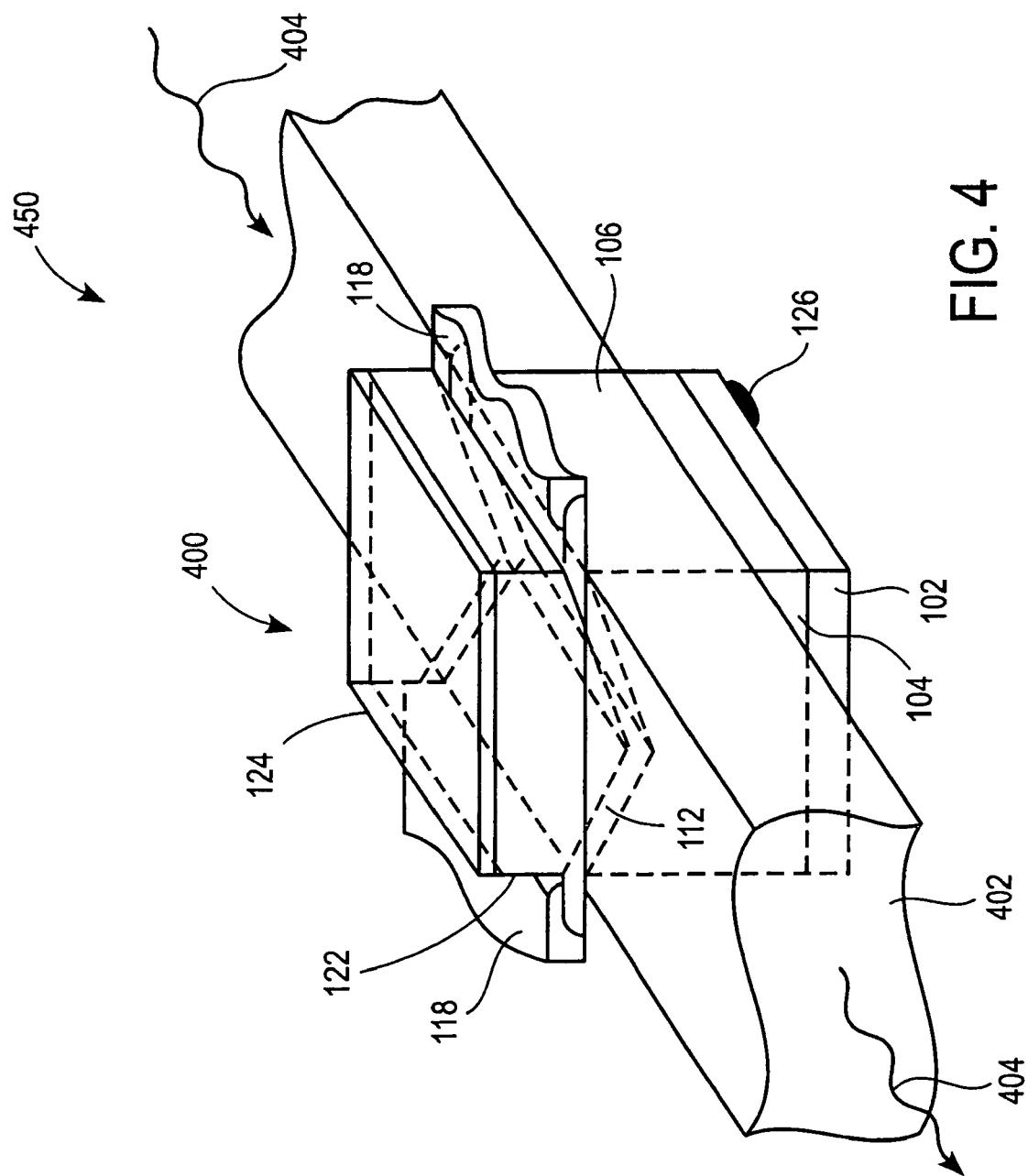
FIG. 4 illustrates the optical modulator of FIG. 1B arranged along a light guide of an optical modulator system.

FIG. 4 illustrates an exemplary application of an optical modulator 400. The optical modulator 400 is arranged along a light guide 402 of an optical modulator system 450. The light guide 402 can be, for example, a silica optical fiber, or an integrated light guide formed on a common substrate with the optical modulator 400. The light guide 402 can be coupled to the optical modulator 400, or alternatively both can be part of a monolithic integrated system. Light 404 can be emitted into the light guide 402 by any suitable light source that can emit light of a wavelength within the desired region. An exemplary light source that can be used is a solid-state laser that emits light within the wavelength range of from about 1.1 µm to 1.6 µm, preferably in the range of from about 1.5 µm to 1.6 µm, e.g., at about 1.55 µm. For example, the light source can be built using compound semiconductor materials of Group 3A and 5A elements of the periodic table, e.g., GaN, AlGaAs, GaAlSb and the like. The light source can be an external light source coupled to the light guide 402, or alternatively can be a component of an integrated system also including the light guide 402, the optical modulator 400, and optionally other components.

As depicted in FIG. 4, light 404 emitted by the light source propagates through the light guide 402, and through the light path of the optical modulator 400. The light path of the optical modulator 400 is defined by the third layer 112, and can also be defined by at least a portion of one or both of the second layer 106 and fourth layer 122. Holes are injected into the confinement region in the third layer 112 to impede light propagating through the third layer 112. As used herein, the term "impede" means to interfere with light propagation by free carrier absorption and/or scattering processes. The injected carriers impede light propagation so as to modulate the intensity of light that exits from the optical modulator 400 and propagates along the light guide 402. As used herein, the term "modulate" means to change the light intensity of propagated light when the injected carriers interact with light. The modulation can range from small changes, such as for encoding data on light for transmission, to large changes, such as when the optical modulator is operated as an on/off shutter. The modulation that is produced by the injected carriers can be a sufficient impediment to light propagation through the optical modulator 400 for a selected application. For example, the optical modulator 400 can be used as an on/off shutter to reduce or modulate the light intensity of propagated light by at least about 50%, preferably by at least about 60%, 70%, 80%, 90% or more, when the injected carriers interact with light. Depending on the application, the optical modulator 400 can alternatively be operated to produce light intensity modulations of less than 50%, such as from about 10% to about 50%.

The optical modulator 400 can produce fast carrier injection. The contact regions 118 act as "pull-out regions." That is, when the contact regions 118 are suitably biased, they remove injected free carriers from the confinement region of the third layer 112. By removing free carriers from the confinement region, light is allowed to travel through the light path of the optical modulator 400 without being impeded by the removed carriers. By forming the contact regions 118 in contact with the third layer 112, the small spacing and, consequently, low resistance decreases the RC time constant and improves high-frequency performance. The contact regions 118 can remove carriers fast from the confinement region, thereby enabling the optical modulator 400 to operate at modulation frequencies of up to at least about 1 GHz, preferably from at least about 1 GHz to at least about 100 GHz, more preferably from at least about 100 GHz to at least about 200 GHz.

Figure 5:
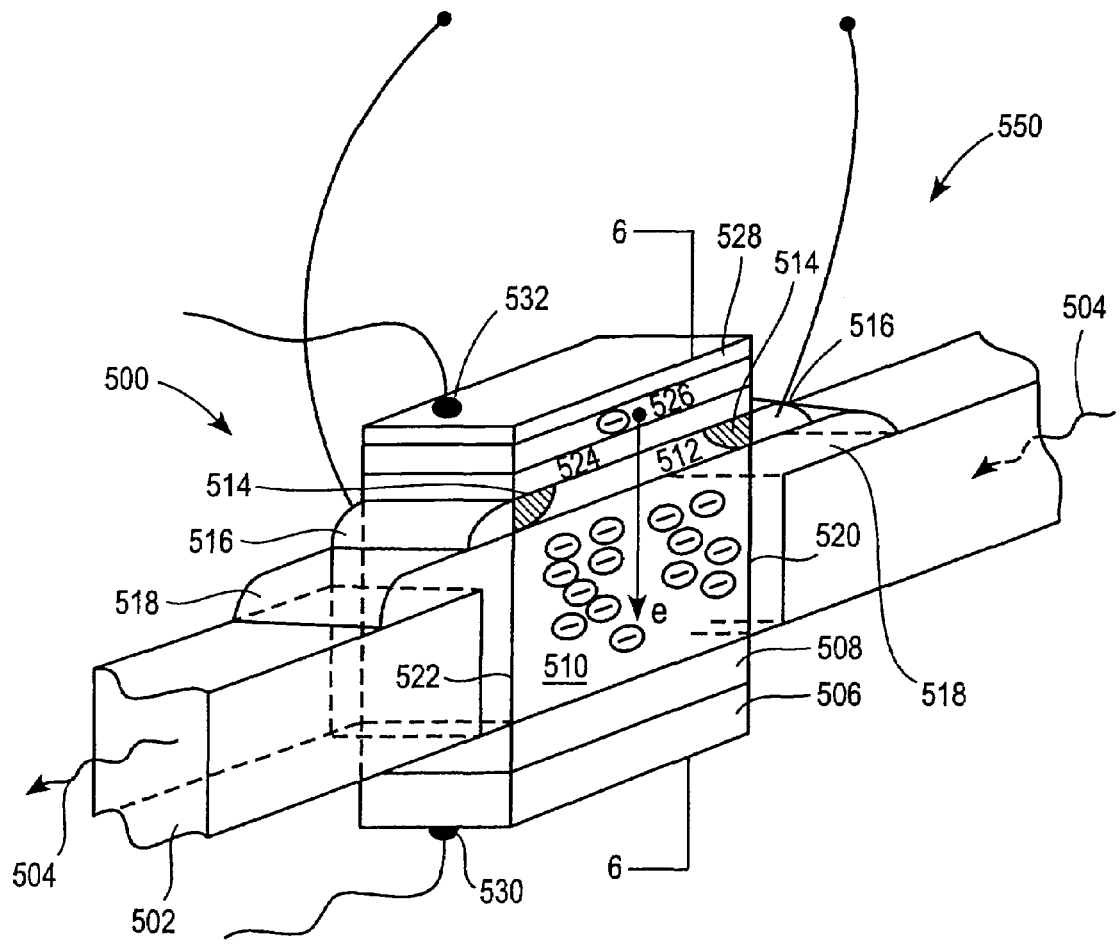
FIG. 5 illustrates another exemplary embodiment of the optical modulator arranged along a light guide of an optical modulator system.

FIG. 5 illustrates an optical modulator 500 according to another exemplary embodiment. The optical modulator 500 is arranged along a light guide 502 of an optical modulator system 550 such that the optical modulator 500 can be operated to interact with light 504 propagating along the light guide 502. The light guide 502 can be, for example, a silica optical fiber, or an integrated light guide formed on a common substrate with the optical modulator 500. In comparison to the optical modulator 100 shown in FIG. 1B, the optical modulator 500 does not include a germanium-containing region and is entirely of silicon-based material. The optical modulator 500 can achieve fast injection and fast removal of mobile electrons, enabling the optical modulator 500 to be used as an on/off shutter to reduce the light intensity, or as an element to modulate the light intensity, of light propagated along the light guide 502 when the carriers interact with the light.

The optical modulator 500 can have different stacking orders of the layers, i.e., pnpn or npnp. The illustrated optical modulator 500 can have an n+ pnp layer stacking arrangement. The optical modulator includes a substrate 506, which can be a wafer or a layer of a suitable material, such as p+ silicon, or a metal. A first layer 508 is formed on the substrate 506. The first layer 508 can be of p– silicon.

A second layer 510 is formed on the first layer 508. The second layer 510 can be of n– silicon. As shown, the second layer 510 is arranged relative to the light guide 502 to provide a light path through the optical modulator 500. Increasing the cross-sectional area of the second layer 510 perpendicular to the propagation direction of light 504 along the light guide 502 increases the size of the light path through the optical modulator 500. The light path can be similar in cross-sectional area to that of the light guide 502. Because the second layer 510 and the first layer 508 are of silicon, the second layer 510 can be fabricated by conventional fabrication techniques with desired height, width and length dimensions. For example, the height and width of the second layer 510 defining the cross-sectional area of the second layer 510 perpendicular to the propagation direction of the light 504 along the light guide 502 can each range from about 100 nm to about 10 microns. For use in integrated circuits, the second layer 510 can have sub-micron dimensions, such as dimensions ranging from about 100 nm to about 500 nm. The second layer 510 can alternatively be formed with larger dimensions, such as from about 1 micron to about 10 microns, so that the cross-sectional area of the light path through the second layer 510 has a larger size. Increasing the length of the light path through the optical modulator 500 along the direction of light propagation through the light guide 502 increases the carrier interaction length and, therefore, can also enhance light modulation capabilities.

In the optical modulator 500, a third layer 512 is disposed on the second layer 510. The third layer 512 can be of n– silicon. The third layer 512 can include heavily-doped n' regions 514. In an alternative embodiment of the optical modulator, the second layer 510 and the third layer 512 can be formed as a single layer of n– silicon and include heavily-doped n' regions 514.

Contact regions 516 can be formed in contact with the heavily-doped n' regions 514 of the third layer 512. The heavily-doped n' regions 514 enhance ohmic contact between the contact regions 516 and the third layer 512.

As shown, the optical modulator 500 can include optional insulator regions 518 located at the inlet end 520 and the outlet end 522 to increase the localization of carriers, i.e., to minimize spillover of the injected carriers into the light guide 502. The insulator regions 518 are preferably thin and of an insulator material that does not absorb strongly at the wavelength of the light propagated through the light guide 502, e.g., at a wavelength of 1.55 μm.

A fourth layer 524 is disposed on the third layer 512. The fourth layer 524 can be of p– silicon. The optical modulator 500 also includes a fifth layer 526 on the fourth layer 524. The fifth layer 526 can be of n– silicon. An optional sixth layer 528 is formed on the fifth layer 526. The sixth layer 528 can be of n+– silicon.

In the embodiment, electrical contacts 530, 532 can be formed in contact with the substrate 506 and sixth layer 528, respectively. The electrical contacts 530, 532 are connected to a voltage source for injecting carriers (electrons) into the second layer 510 to interact with light 504 propagating through the confinement region of the second layer 510.

Figure 6:
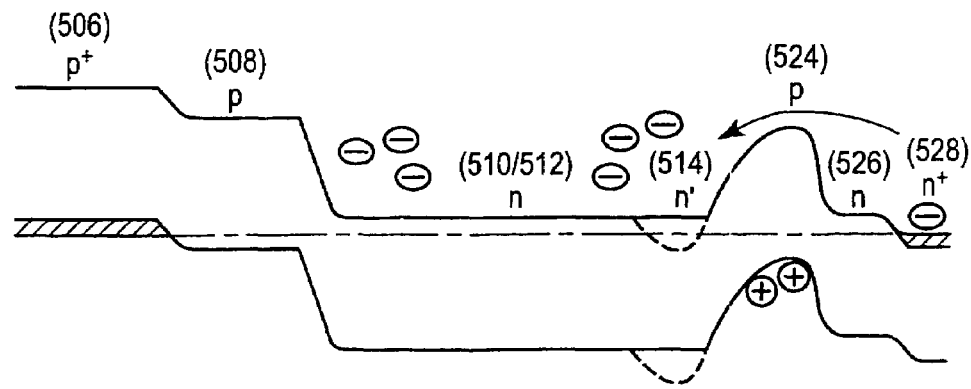
FIG. 6 depicts an energy band diagram for the optical modulator shown in FIG. 5 along line 6—6.

FIG. 6 depicts an energy band diagram for an embodiment of the optical modulator 500 taken along line 6—6 shown in FIG. 5, in the direction from the substrate 506 to the sixth layer 528. The dashed line in the diagram indicates the location of a heavily-doped n' region 514 of the optical modulator 500.

In the optical modulator 500, carrier injection can be fast, and due to the suitably dimensioned cross-sectional area of the light path of the second layer 510, a suitably large number of carriers can be injected into the light path to impede light propagation. The contact regions 516 can be suitably biased to remove injected electrons from the confinement region of the second layer 510 to allow light to travel through the optical modulator 500 without being impeded by the removed carriers. The contact regions 516 can remove carriers fast from the second layer 510, thereby enabling the optical modulator 500 to operate at modulation frequencies of up to at least 1 GHz, preferably from at least about 1 GHz to at least about 100 GHz, more preferably from at least about 100 GHz to at least about 200 GHz.

An exemplary embodiment of a method of modulating light comprises emitting light from a light source at a selected wavelength. The light is propagated through a confinement region of an optical modulator. The confinement region is of semiconductor material defining at least a portion of a light path through the optical modulator. Holes or electrons are injected into the confinement region to impede light propagating through the confinement region. The injected carriers are removed from the confinement region at contact regions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An optical modulator, comprising:
  a confinement region of semiconductor material, the confinement region defining at least a first portion of a light path through the optical modulator, the confinement region having a V-shaped cross-section perpendicular to a propagation direction of light through the light path;
  electrical contacts for connection with a voltage source for injecting carriers into the confinement region to impede light propagating through the confinement region; and
  contact regions in electrical contact with the confinement region for removing injected carriers from the confinement region.

2. The optical modulator of claim 1, wherein the confinement region is a portion of a heterostructure region.

3. The optical modulator of claim 1, wherein the confinement region is a first layer of $Si_{1-x}Ge_x$, where $x \leq 1$.

4. The optical modulator of claim 3, wherein $x \geq 0.1$.

5. The optical modulator of claim 3, wherein the first layer has a thickness of from about 5 nm to about 500 nm.

6. The optical modulator of claim 5, wherein the first layer has a thickness of from about 100 nm to about 500 nm.

7. The optical modulator of claim 3, comprising:
  a second layer of n– silicon defining a second portion of the light path;
  a first interface defined by opposed surfaces of the first layer and the second layer;
  a third layer of n– silicon defining a third portion of the light path; and
  a second interface defined by opposed surfaces of the first layer and the third layer.

8. The optical modulator of claim 7, wherein:
  the first layer is disposed on a V-shaped groove of the third layer; and
  the V-shaped groove is defined by [110] planes or [111] planes.

9. The optical modulator of claim 8, comprising:
  a substrate of silicon; and
  an insulator material disposed on a surface of the substrate;
  wherein the third layer is disposed on the surface of the substrate and on the insulator material.

10. The optical modulator of claim 1, wherein the contact regions directly contact the confinement region.

11. An optical modulator system, comprising:
  a light guide;
  a light source operable to emit light which propagates along the light guide; and
  an optical modulator according to claim 1 arranged along the light guide such that the light can propagate through the light path.

12. An optical modulator, comprising:
  an npnp or pnpn silicon layer structure including a confinement region, the confinement region defining at least a portion of a light path through the optical modulator;
  electrical contacts for connection with a voltage source for injecting carriers into the confinement region to impede light propagating through the confinement region; and
  contact regions in electrical contact with the confinement region for removing injected carriers from the confinement region.

13. The optical modulator of claim 12, wherein the confinement region is an n– silicon region, and comprising heavily-doped silicon regions in contact with the n– silicon layer and the contact regions.

14. The optical modulator of claim 12, wherein the confinement region has a cross-section perpendicular to a propagation direction of the light along the light path, and the cross-section has a height and a width of from about 100 nm to about 10 microns.

15. An optical modulator, comprising:
  a confinement region of semiconductor material, the confinement region defining at least a portion of a light path through the optical modulator, the confinement region having a V-shaped cross-section perpendicular to a propagation direction of light through the light path;
  means for connection with a voltage source for injecting carriers into the confinement region to impede light propagating through the confinement region; and
  means in electrical contact with the confinement region for removing the injected carriers from the confinement region.

16. An optical modulator system, comprising:
  a light guide;
  a light source operable to emit light which propagates along the light guide; and
  an optical modulator according to claim 15 arranged along the light guide such that the light can propagate through the light path.

17. A method of modulating light, comprising:
  emitting light from a light source;
  propagating the light through a confinement region of an optical modulator, the confinement region being of semiconductor material defining at least a portion of a light path, the confinement region having a V-shaped cross-section perpendicular to a propagation direction of the light through the light path;
  injecting carriers into the confinement region to impede light propagating through the confinement region; and
  removing injected carriers from the confinement region.

18. The method of claim 17, wherein the light is infrared light.

19. The method of claim 17, wherein the light has a wavelength of about 1.55 microns.

20. The method of claim 17, wherein the light is modulated at a modulation frequency ranging from about 1 GHz to at least about 200 GHz.

21. The method of claim 17, wherein the carriers are holes.

22. The method of claim 17, wherein the carriers are electrons.

23. A method of making an optical modulator, comprising:
    forming a confinement region of semiconductor material, the confinement region defining at least a portion of a light path through the optical modulator, the confinement region having a V-shaped cross-section perpendicular to a propagation direction of light through the light path;
    forming electrical contacts for connection with a voltage source for injecting carriers into the confinement region to impede light propagating through the confinement region; and
    forming contact regions in electrical contact with the confinement region for removing injected carriers from the confinement region.

24. The method of claim 23, wherein the confinement region (i) is a portion of a heterostructure region, (ii) is of $Si_{1-x}Ge_x$, where $x \leq 1$, and (iii) has a thickness of from about 5 nm to about 500 nm.

25. The method of claim 23, comprising:
    forming an insulator material on a surface of a substrate of silicon;
    forming a layer of silicon on the surface of the substrate and on the insulator material, the layer having a V-shaped groove; and
    forming the confinement region on the V-shaped groove.

26. The method of claim 25, wherein the layer of silicon is formed by lateral epitaxial chemical vapor deposition.

27. The method of claim 23, wherein the contact regions directly contact the confinement region.

28. A method of making an optical modulator, comprising:
    forming an npnp or pnpn silicon layer structure including a confinement region, the confinement region defining at least a portion of a light path through the optical modulator;
    forming electrical contacts for connection with a voltage source for injecting carriers into the confinement region to impede light propagating through the confinement region; and
    forming contact regions in electrical contact with the confinement region for removing injected carriers from the confinement region.

29. The method of claim 28, wherein the confinement region is an n− silicon region, and comprising forming heavily-doped silicon regions in contact with the n− silicon layer and the contact regions.

* * * * *